(12) United States Patent
Constantine

(10) Patent No.: US 6,920,715 B2
(45) Date of Patent: Jul. 26, 2005

(54) RABID ANIMAL CONTROL METHOD

(76) Inventor: Denny George Constantine, 1899 Olmo Way, Walnut Creek, CA (US) 94598

(*) Notice: Subject to any disclaimer, the term of this patent is extended or adjusted under 35 U.S.C. 154(b) by 0 days.

(21) Appl. No.: 10/391,177

(22) Filed: Mar. 18, 2003

(65) Prior Publication Data

US 2004/0163301 A9 Aug. 26, 2004

Related U.S. Application Data

(63) Continuation-in-part of application No. 09/779,771, filed on Feb. 8, 2001, now abandoned.

(51) Int. Cl.[7] ........................ A01M 23/00; A01M 23/02; A01M 23/08; A01M 23/14
(52) U.S. Cl. ........................ 43/65; 43/58; 43/64; 43/124
(58) Field of Search ................................ 43/58, 60, 61, 43/64, 65, 67, 107, 119, 124, 132.1

(56) References Cited

U.S. PATENT DOCUMENTS

| | | | | |
|---|---|---|---|---|
| 59,953 A | * | 11/1866 | Brear | 43/64 |
| 721,531 A | * | 2/1903 | Alston | 43/61 |
| 1,807,076 A | * | 5/1931 | Sweet | 43/124 |
| 2,488,466 A | * | 11/1949 | Carver | 43/65 |
| 3,638,346 A | * | 2/1972 | Stein | 43/65 |
| 3,818,100 A | * | 6/1974 | Linhart | 514/457 |
| 3,931,865 A | * | 1/1976 | Levitt | 43/107 |
| 3,990,173 A | * | 11/1976 | Barone | 43/77 |
| 4,105,992 A | * | 8/1978 | Luciano | 43/124 |
| 4,251,945 A | * | 2/1981 | Tasma | 43/132.1 |
| 4,464,859 A | * | 8/1984 | Gompers | 43/58 |
| 4,669,237 A | * | 6/1987 | Constantine | 52/101 |
| 4,757,638 A | * | 7/1988 | Lafforthun | 43/66 |
| 5,027,547 A | * | 7/1991 | Livshin | 43/124 |
| 5,181,338 A | * | 1/1993 | Chatten | 43/58 |
| 5,241,778 A | * | 9/1993 | Price | 43/124 |
| 5,311,697 A | * | 5/1994 | Cavanaugh et al. | 43/132.1 |
| 5,325,622 A | * | 7/1994 | Merickel | 43/61 |
| 5,341,592 A | * | 8/1994 | Lafforthun | 43/66 |
| 5,836,114 A | * | 11/1998 | Ohba | 43/124 |
| 6,226,933 B1 | * | 5/2001 | Nelson et al. | 43/124 |
| 6,671,998 B1 | * | 1/2004 | Lawrence, Sr. | 43/58 |

OTHER PUBLICATIONS

The world's most advanced bat trap, Generation 4 professional bat harp trap, Available web site: http://www.batmanagement.com/Ordering/harp%20traps/harp2.html, Accessed on Apr. 8, 2004.*

House Bat Management, Bat Removal, Available web site: http://www.greatplains.org/npresource/1998/housebat/batrem.htm, Accessed on Apr. 8, 2004.*

Rat Fact and Fiction, Available web site: http://home.earthlink.net/~autumnglory/rats/facts.htm, Accessed on May 28, 2004.*

Ask Dr. Stoll, Information about combining Conventional & Alternative Medicine, Immunity and Stress, Available web site: http://askwaltstollmd.com/body_immune.html, Accessed on May 28, 2004.*

(Continued)

*Primary Examiner*—Darren W. Ark
(74) *Attorney, Agent, or Firm*—Robert Charles Hall

(57) ABSTRACT

A method is disclosed for luring attack-prone, rabies-infected mammals (e.g., carnivores, bats) into restraint and/or euthanasia but not luring normal, uninfected animals.

10 Claims, 3 Drawing Sheets

OTHER PUBLICATIONS

National Center for Infectious Diseases, Rabies Questions & Answers, Available web site: http://www.cdc.gov/ncidod/dvrd/rabies/ques&ans/q&a.htm, Accessed on May 28, 2004.*

C.W. Scherer, (May 8, 1995), University of Florida Book of Insect Records, Chapter 9 Fastest Wing Beat, Available web site: http://ufbir.ufl.edu/chap09.htm, Acessed on: May 31, 2004.*

Michelle Finnegan, The Physics Factbook, Frequency of Bee Wings, Available web site: http://hypertextbook.com/facts/1999/MichelleFinnegan.shtml, Accessed on May 31, 2004.*

Aerodynamics of Animals, Insects, Insect Wings in General, Available web site: http://wings.avkids.com/Book/Animals/instructor/insects–02.html, Accessed on May 31, 2004.*

How Well do Dogs and Other Animals Hear?, Jun. 3, 2003, Available web site: http://www.Isu.edu/deafness/Hearing Range.html, Accessed on Dec. 27, 2004.*

Kurtus, Ron, Sensing Pitch or Sound Frequencies, Mar. 7, 2001, Available web site: http://www.school–for–champions.com/senses/hearpitch.htm, Accessed on Dec. 27, 2004.*

* cited by examiner

RABID ANIMAL CONTROL METHOD

CROSS-REFERENCE TO RELATED APPLICATIONS

This application is a continuation-in-part of U.S. patent application Ser. No. 09/779,771, filed Feb. 8, 2001 ABANDONED. Such application is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Rabies is a viral infection of mammals, including man, usually spread through bites of infected carnivores (Order Carnivora) or bats (Order Chiroptera). Rabies virus, as used here, refers to all members of the worldwide viral genus Lyssavirus (Smith, Clinical Microbiology Reviews 9:166–176, 1996) and new members of that genus that continue to be discovered (e.g., Gould et al., Virus Research 54:165–187, 1998), whatever future taxonomic revisions may suggest. These viruses typically produce encephalitis in mammalian hosts, resulting in transmission of virus to subsequent victims via bites or contamination of mucosal surfaces (Constantine, Rabies. In Hoeprich et al., Infectious Diseases. Lippincott, 1994) and sometimes via aerosols (Constantine, USPHS Publ. 1617, 1967). The virus occurs nearly worldwide in wildlife and in domestic dogs and cats, particularly where pet vaccination is not practiced. Some 50,000 persons and millions of animals reportedly die of the disease each year, and 8 million persons take antirabies treatment annually.

Rabies control is expensive but has been partially achieved in developed countries by postexposure antirabies treatment of people and vaccination of pets. Local destruction of wild carnivore populations during outbreaks has had some temporary effect, but the practice has come under increasing opposition by conservationists and has been outlawed in many areas.

In recent years the vaccination of wild carnivore populations has been attempted as a control measure, using live vaccines, but both target and nontarget species sometimes have been infected by the vaccines, producing clinical rabies. Safety measures have been lacking, and results are of questionable value.

The insect-eating bat populations of North America generally have been spared control by destruction, because they are needed to control insects, and only about one-tenth of one percent are known to be infected with rabies.

It is apparent that the ideal approach to animal rabies control would be to eliminate only rabies-infected animals, a challenge that nobody has dared to consider. The inventor pondered this dilemma and concluded that success might result from exploiting differences between rabid and uninfected animals. A major difference is the insane, attack-prone behavior of the rabid animal. Moreover, knowledge of the disease in man and animals has demonstrated that the sensory systems (auditory, visual, tactile, odor, taste) of infected individuals develop an increased sensitivity and responsiveness to sensory stimuli, a condition known as hyperesthesia.

This increased sensitivity to stimuli has resulted in various abnormal responses, the most noticeable one being attacks by infected individuals on animate or inanimate sources of a sensory stimulus. For example, rabid animals are known to attack persons who are yelling, laughing, shooting a gun, or driving a vehicle, and moving or noisy animals or vehicles have been attacked. Therefore, it appeared promising that sensory stimuli might be used to induce rabid animals to attack the source and be trapped or destroyed in the process. But suitable stimuli should be specific for rabid animals and should not attract normal animals. Thus, odor and taste would not be promising candidates. Tactile stimuli, such as touching or contrasting temperatures, probably could be used only secondary to a more specific primary stimulant, because they would not be specific enough in themselves. Air movement, a strong rabies behavior tactile stimulant, would seem useful, at least in a secondary role, but it might be attractive to some normal animals if used alone. Useful visual stimuli, such as flashing bright lights or moving objects, including motor vehicles, appeared either environmentally objectionable, impractical in most instances, or disturbing to people and normal animals.

Auditory stimuli, with or without secondary stimuli, seemed to be promising except for disturbance of man and normal animals, an objection that might be circumvented by employing muted sounds or sounds above the hearing range of man, birds, reptiles, and most mammals but within the range of most target species (i.e., bats and carnivores) and preferably repellant or unattractive to uninfected animals.

Normal wild animals can be attracted or repelled in various ways, including the use of sounds. Natural or contrived sounds of prey will attract carnivores. Natural or playback of recorded bat calls will attract bats. However, the objective was not to attract normal animals but to lure only attack-prone, rabies-infected animals. Some sounds (e.g., playback of recorded animal calls) would be expected to attract both rabid and normal animals if for different reasons. Such sounds could not be used, because they would lure normal animals.

Certain species of bats were chosen for initial studies to discern a pattern or model for subsequent application to other mammal groups, primarily carnivores. The study concentrated on the western pipistrelle bat (*Pipistrellus hesperus*), the more abundant of three species of bats then known to engage in rabies-driven attacks on people in the western United States (Constantine, Public Health Reports 82:867–888, 1967).

Of the sensory stimuli to be considered as initiators of attacks (auditory, visual, tactile, odor and taste), auditory stimuli appeared to be the most promising to use as a primary lure, because nonbiological sounds (neither actual, recorded or simulated animal sounds) should be attractive to rabid bats and/or rabid carnivores but not attractive or possibly repellent to normal, uninfected animals. Moreover, the hearing abilities of bats and wild carnivores extend into ultrasonic ranges, up to 200 kilohertz or kHz in some bats, well above the hearing abilities of man and domestic herbivores, 16–20 kHz and 22 kHz respectively (Fay and Popper. Comparative Hearing: Mammals. Springer-Verlag, 1994). In this respect ultrasound would appear ideal for this purpose, a view tempered by knowledge that ultrasound does not carry as far as audible sound; it dissipates quickly as distance from the source increases.

Attacks on persons by flying rabid bats occurred during daylight in incidents wherein the time was recorded. Of 37 attacks, sound associated with the victim was noted or implied in all cases, usually yelling due to fear of a flying bat, although some victims were driving noisy, open heavy vehicles, one was operating a jackhammer, and two were target shooting. Three barking dogs were attacked. Thus, sounds were consistently associated with attacks, but motion, often associated with sound, might be a factor.

The inventor surveyed large areas of California by aircraft, 4-wheel drive vehicles, and on foot, and he captured many thousands of bats to locate areas where maximal concentrations of these bats occur. He then proceeded with nighttime trials in efforts to attract attacking bats into traps, using a variety of sounds as potential lures. Sounds ranged from recorded noises associated with attacks (e.g., jackhammer, motorcycle) through nonspecific sounds (e.g., jet engines, smoke alarm, whistles) to a variety of ultrasounds. These nighttime trials were not successful.

Finally, he reasoned that his nighttime efforts were competing with myriads of normal bats that logically are targeted by rabid bats. Since rabid bats are also active in daytime, when normal bats rarely fly, trials should be done in daylight to escape the nighttime competition offered by normal bats. Therefore, a trap equipped with a smoke alarm lure was installed in a high bat density area south of Death Valley and kept active day and night. On the third day it contained an extremely belligerent rabid bat.

The smoke alarm lure has a sound intensity of 105 decibels at ten centimeters and a sound frequency range from five to 20 kHz, about 95 percent of which is at the lower (audible) end of the range. It could be heard at a distance of a quarter mile. As the alarm sound can be a nuisance to people and normal animals, the alarm was replaced by another device of similar sound intensity, but at an inaudible frequency, 48 kHz. Though inaudible by man, domestic herbivores, and most wildlife and consequently detectable from a lesser distance than the successful smoke alarm, the device sufficed to attract many rabid bats, as described below.

The inventor distributed a series of bat traps bearing the aforementioned type of ultrasonic lure throughout the same and similar areas wherein a total of 66 rabid (only) bats have now been taken. The nonbiological sound proved most effective when emitted in short bursts, such as one-third of a second in duration, followed by equal intervals of silence. Adjacent control traps (traps that lacked sound lures) did not take any bats. Twenty three healthy (only) bats were taken simultaneously by the conventional mist netting method for comparative purposes.

The unexpectedly high level of local rabid bat trapping success provides assurance that this new method will be highly useful in severely reducing or eliminating rabies locally and in stopping the spread of rabies when strategically applied on a suitable scale.

In addition to the foregoing bat trapping activities the inventor has used standard boxlike traps, designed to live trap carnivores, in combination with nonbiological sound lures to attract and capture rabid (only) carnivores. These trials, performed on skunks in the field as well as in the laboratory, have yielded only successful results. Adjacent traps the lacked sound attractants were used as controls. These trials with rabid carnivores are ongoing and will include additional species of wild as well as domestic carnivores to further confirm the technique's effectiveness for rabies control on a global level.

BRIEF SUMMARY OF THE INVENTION

The invention consists of methods of assaulting or irritating the already hyperacute senses of rabid animals, especially the hearing sense, to compel the animals to attack the source of the irritant, located at or in a trap and/or euthanizing mechanism, to the exclusion of normal, rabies-free animals.

As the inventor is an expert in the field of bat rabies and could most conveniently test the method on thousands of free flying bats in nature, he selected bats as a model mammalian group on which to test the method, the results of which would be basically applicable to all mammalian species, in accord with the extensive literature and widespread knowledge of rabies. Subsequently 66 rabies-infected bats were successfully lured by nonbiological sound and trapped, to the exclusion of normal, uninfected bats.

In the initial developmental phase of this method, an audible sound source (a battery-powered smoke alarm) was mounted on a trap to attract and thus lure rabid, attacking bats into the trap. That sound source, though successful, could be a nuisance, however, so an ultrasonic sound source was adapted for subsequent trials to produce a more suitable product.

Although a variety of bat restraining devices (nets, traps, etc.) could have been used, the trap employed thus far was a small version of a design developed by the inventor in the 1940's (Constantine, Journal of Wildlife Management 22:17–22, 1958). The trap was a rectangular metal frame, two feet wide by three feet high, which supported a continuous series of vertically-stretched wires spaced one inch apart. The frame base extended downward into a smooth-sided hopper which extended into a cage. Ordinarily this type of trap lacks a lure; instead it is placed where bats normally fly, such as at cave entrances. However, it was equipped with a sound lure to attract rabid bats for the present trials. The sound source was mounted centrally behind the wires and the sound directed forward through the wires. While trying to attack the sound source, bats encounter the vertical wires, which are too fine for the bats to detect with their sonar system, and they slide down the wires through the hopper into the cage.

A modification of the above system eliminated the cage and directed captured bats through the hopper directly into a chamber to euthanize the animals and optionally to inactivate rabies virus.

The audible as well as ultrasonic nonbiologic sound decoy techniques also have been used successfully to attract rabid (only) skunks into standard boxlike traps to the exclusion of healthy skunks. These ongoing trials are designed to include various other rabid wild and domestic carnivorous mammal species.

The object of the present invention is to provide a method of controlling attack-prone rabid animals by stimulating and thus directing them to attack stimuli (lure) sources, whereby they are automatically restrained and/or destroyed.

A further object in accord with the preceding object is to reduce the incidence of rabies in mammalian populations that commonly serve as rabies virus hosts (e.g., bats, wild and domestic carnivores), thus reducing the rabies threat to man, his domestic animals, and wildlife.

BRIEF DESCRIPTION OF THE SEVERAL VIEWS OF THE DRAWING

The drawings depict two well-known live animal trap designs, a harp trap for catching bats (FIGS. 1 and 2) and a box-shaped trap for catching four-footed animals such as skunks, foxes, and raccoons (FIGS. 3 and 4), to which sound-producing lures (9 and 13) have been attached to invite attacks by rabid animals.

DETAILED DESCRIPTION OF THE INVENTION

Basically, any of a variety of or combination of sounds (which may include high frequency sounds inaudible to man, etc.), with or without additional sensory stimuli, is/are used to attract the attention of and thus incite rabid animals (e.g., carnivores or bats) to attack the sound source. However, only nonbiological sound (neither actual, recorded or simulated animal sounds) should be used to avoid attracting normal, healthy animals. The nonbiological sound has proved most effective if divided into short sound bursts of about one-third second duration, separated by equal intervals of silence. The nonbiological sound source is positioned so that the attacking animal will be restrained and/or euthanized during its effort to attack the source. Whereas the use of sensory stimuli, especially nonbiological sound, to attract specifically rabid animals, comprises this invention, any of many known and existing restraint and/or destruction systems and devices may be used for actual trapping or destruction of the rabid animal. Combined with nonbiological sound sources to lure rabid animals, example well-known traps for bats and for carnivores follow.

Figure 1:
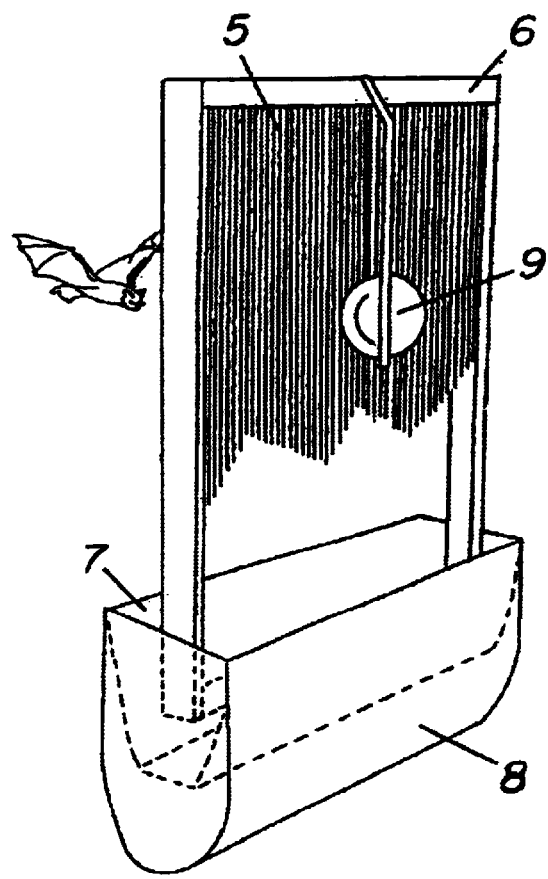
Figure 2:
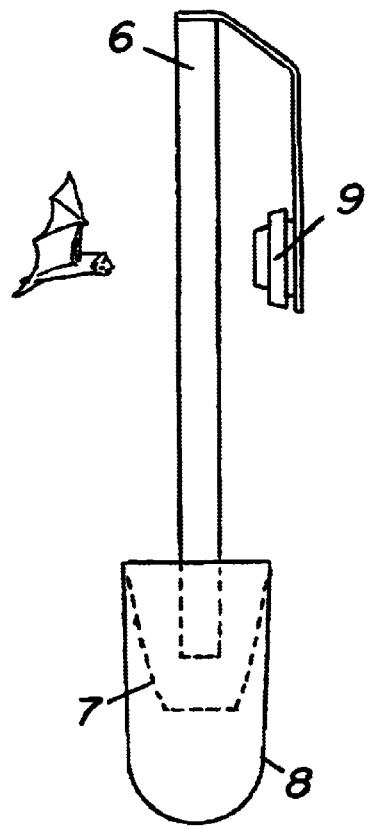

Bats are sometimes captured in a "harp trap", such as the one illustrated in FIGS. 1 and 2, after the trap is placed where bats normally fly, such as in cave entrances. The flying bats encounter vertically-stretched wires (or plastic lines) 5, of too small a diameter for the bats to detect with their echolocation sonar systems, and they slide down the wires through a smooth-sided hopper 7, over which they cannot crawl upward to escape, and thence downward into a holding cage or euthanizing chamber 8. In order to attract and capture specifically rabid bats, a nonbiological sound source (e.g., a batteryoperated smoke alarm in this example) 9 has been attached to the "harp trap" and positioned behind the wires to attract attack-prone rabid bats, which are captured as they try to attack the sound source. Combined with any effective sound lure, the hopper and cage alone or even a smooth-sided bucket or similar container or sticky, adhesive material could be utilized in restraining and/or euthanizing rabid bats, though less effectively.

Figure 5:
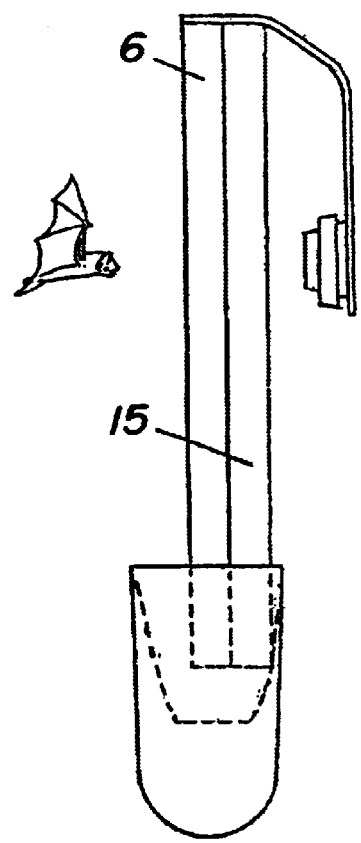
FIG. 5 is a side view showing two wire-bearing frames used in tandem.
Figure 6:
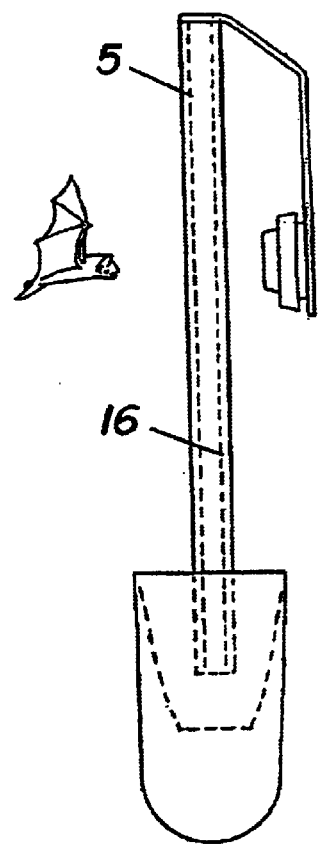
FIG. 6 is a side view showing two sets of wires used in tandem.

Two or more wire-bearing frames 6 and 15 or entire traps may be placed together in tandem, separated by one to three inches, to increase the trap's effectiveness, as the occasional bat may pass through one barrier and escape capture. This is shown in FIG. 5. Similarly, as indicated by the dashed lines in FIG. 6, two or more sets of wires 5 and 16 may be installed in tandem within a single frame to increase trap effectiveness.

Figure 3:
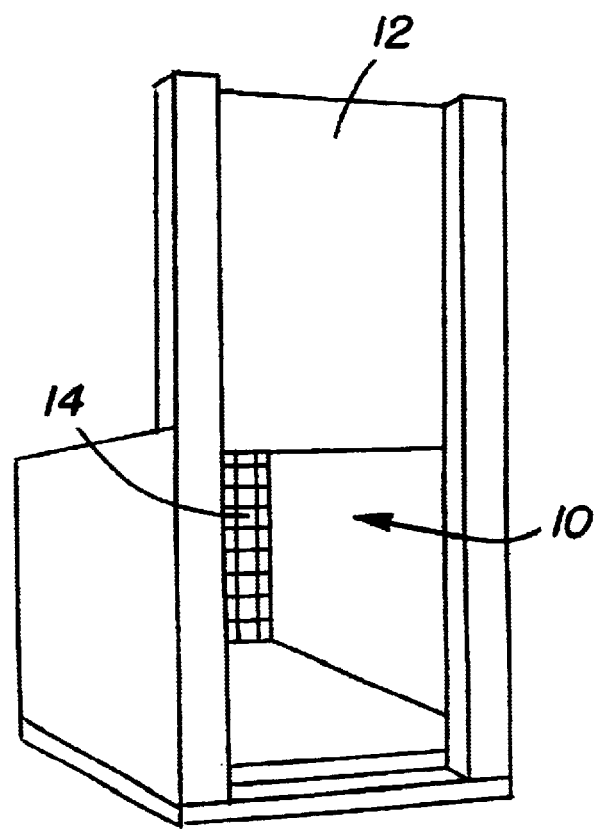
Figure 4:
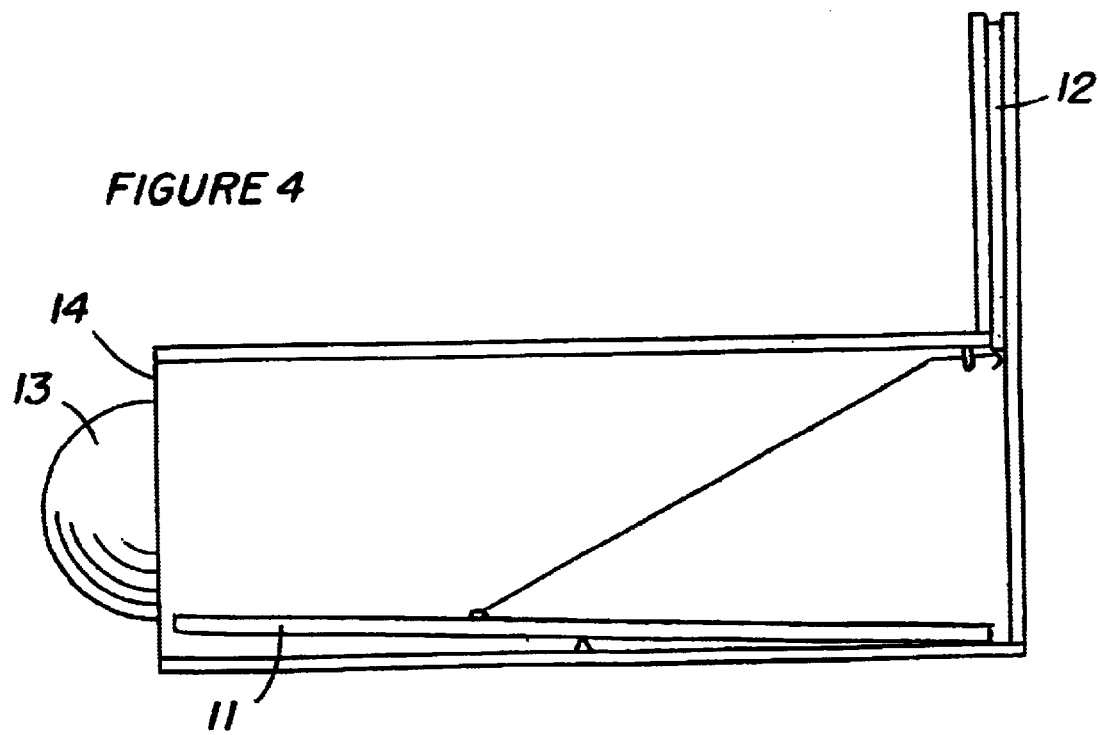

Carnivores, such as dogs, cats, skunks, or foxes, are routinely captured unharmed in boxlike "live traps", such as the one illustrated in FIGS. 3 and 4, by placing a bait (food, scent, etc.) deep in the boxlike interior. The animal enters through the door opening 10, proceeding inward toward the bait, and in so doing trips any of a variety of releases 11 whereupon the door 12 closes, trapping the animal inside. In order to attract and restrain specifically rabid animals, the foregoing bait is replaced by a nonbiologic sound source, in this example housed within a protective cover (e.g., a metal bowl) 13, positioned on the outside of the deep end mesh wall 14 of the trap. Sound is directed through the mesh 14 continuing through the trap outward through the open door. As a rabid animal enters the trap and tries to attack the sound source, it trips the release 11, whereupon the door 12 closes behind it.

While certain preferred embodiments of the invention have been specifically disclosed, it should be understood that the invention is not limited thereto as many variations will be readily apparent to those skilled in the art, and the invention is to be given its broadest possible interpretation within the terms of the following claims.

I claim:

1. An apparatus for luring attack-prone, rabies-infected bats into restraint but not luring normal, uninfected bats, comprising:

a frame having a series of taut vertical wires therein;

a nonbiological sound source for producing nonbiological sound above the range of hearing for humans mounted behind and facing said wires which assaults the auditory hyperesthesia of said rabies-infected bats; and a smooth-sided hopper below said frame;

whereby the rabies-infected bats attack said nonbiological sound source, when producing nonbiological sound encounter the wires, and slide down said wires into said hopper.

2. The apparatus of claim 1 wherein a cage is below said hopper so that the rabies-infected bats encountering said wires slide down said wires into said hopper and into said cage.

3. The apparatus of claim 1 wherein said wires are too fine for the rabies-infected bats to detect with their sonar system.

4. The apparatus of claim 1 wherein the wires are spaced about one inch apart.

5. The apparatus of claim 1 wherein two or more of the apparatuses for luring attack-prone, rabies-infected bat into restraint are used in tandem.

6. The apparatus of claim 1 wherein two or more of the frames having a series of taut vertical wires are used in tandem, separated by one to three inches.

7. The apparatus of claim 1 wherein the vertical wires are plastic lines.

8. The apparatus of claim 1 wherein the nonbiological sound is continuous without interruption.

9. The apparatus of claim 1 wherein the nonbiological sound is produced in short bursts of about one-third second duration, separated by equal periods of silence.

10. An apparatus for luring attack-prone, rabies-infected bats into restraint but not luring normal, uninfected bats, comprising:

a frame having a series of taut vertical wires therein;

a nonbiological sound source for producing nonbiological sound above 16 kHz mounted behind and facing said wires which assaults the auditory hyperesthesia of said rabies-infected bats; and a smooth-sided hopper below said frame;

whereby the rabies-infected bats attack said nonbiological sound source, when producing nonbiological sound encounter the wires, and slide down said wires into said hopper.

* * * * *